United States Patent
Manasse et al.

(10) Patent No.: US 11,947,691 B2
(45) Date of Patent: Apr. 2, 2024

(54) SYSTEMS AND METHODS FOR MANAGING ACCESS RIGHTS FOR A COPY OF AN ORIGINAL DIGITAL DOCUMENT

(71) Applicant: i2Chain, Inc., San Ramon, CA (US)

(72) Inventors: Mark Steven Manasse, San Francisco, CA (US); Sanjay Jain, Sammamish, WA (US); Ajay Jotwani, San Ramon, CA (US); Dave Swan, San Ramon, CA (US)

(73) Assignee: I2CHAIN, INC., San Ramon, CA (US)

( * ) Notice: Subject to any disclaimer, the term of this patent is extended or adjusted under 35 U.S.C. 154(b) by 279 days.

(21) Appl. No.: 17/339,915

(22) Filed: Jun. 4, 2021

(65) Prior Publication Data
US 2021/0383004 A1  Dec. 9, 2021

Related U.S. Application Data

(60) Provisional application No. 63/034,783, filed on Jun. 4, 2020.

(51) Int. Cl.
*G06F 21/62*  (2013.01)
*G06F 16/93*  (2019.01)

(52) U.S. Cl.
CPC .......... *G06F 21/6209* (2013.01); *G06F 16/93* (2019.01)

(58) Field of Classification Search
CPC .............................. G06F 21/6209; G06F 16/93
See application file for complete search history.

(56) References Cited

U.S. PATENT DOCUMENTS

| | | | | |
|---|---|---|---|---|
| 5,978,484 A * | 11/1999 | Apperson | ............. | G06F 21/125 713/170 |
| 6,446,069 B1 * | 9/2002 | Yaung | ............. | G06F 21/629 707/999.009 |
| 6,581,060 B1 * | 6/2003 | Choy | ............. | G06F 16/284 707/999.009 |
| 8,239,682 B2 | 8/2012 | Meehan et al. | | |
| 8,474,054 B2 | 6/2013 | Vantalon et al. | | |
| 8,965,808 B1 * | 2/2015 | Van Erlach | ............. | G06Q 50/184 726/26 |
| 9,871,773 B2 | 1/2018 | Meehan et al. | | |
| 9,959,395 B2 | 5/2018 | Pathak et al. | | |
| 10,079,833 B2 | 9/2018 | Pathak et al. | | |

(Continued)

*Primary Examiner* — Vance M Little
(74) *Attorney, Agent, or Firm* — Kanika Radhakrishnan; Evergreen Valley Law Group (57) ABSTRACT

Embodiments of the present disclosure provide systems and methods for managing access rights for a copy of an original digital document. The method performed by a server system includes receiving a request for generating a copy of an original document. The method includes performing an authorization of the request for generating the copy of the original document based on the access rights associated with the original document. Further, the method includes generating a copy document of the original document upon successful authorization. The method includes determining the access rights defined for the copy document in the original document. The method further includes transmitting the access rights to the copy document. The method includes sending the copy document with the access rights. The access rights set on the copy document facilitate the user to perform document-related operations on the copy document.

16 Claims, 8 Drawing Sheets

(56) References Cited

U.S. PATENT DOCUMENTS

| | | | |
|---|---|---|---|
| 10,375,039 B2 | 8/2019 | Meehan et al. | |
| 2006/0059570 A1* | 3/2006 | Kawabuchi | H04L 63/101 |
| | | | 726/28 |
| 2006/0218643 A1* | 9/2006 | DeYoung | H04N 21/83555 |
| | | | 348/E7.06 |
| 2013/0291122 A1* | 10/2013 | Vyas | G06F 21/6218 |
| | | | 726/28 |
| 2016/0364550 A1* | 12/2016 | Pathak | H04L 63/0428 |

* cited by examiner

| ATTRIBUTES | ORIGINAL DOCUMENT | COPY DOCUMENT |
|---|---|---|
| 402 → COPY | 1 | 1 |
| 404 → EDIT | 0 | 1 |
| 406 → PRINT | 0 | 0 |
| 408 → CONTENT COPYING | 0 | 1 |
| 410 → VIEW | 1 | 1 |
| 412 → FILLING FORM FIELDS | 0 | 1 |
| 414 → SHARE | 0 | 1 |

SYSTEMS AND METHODS FOR MANAGING ACCESS RIGHTS FOR A COPY OF AN ORIGINAL DIGITAL DOCUMENT

TECHNICAL FIELD

The present disclosure relates to a document management system and, more particularly, relates to systems and methods for managing access rights for a copy of an original digital document (or an original electronic document).

BACKGROUND

Computerized documents (or digital documents) are used extensively for sharing information or for record purposes, as they are very convenient and can be readily sent from one party to another party. In an example scenario, the digital document (e.g., portable document format (PDF) files) may be provided with access rights for operations such as display/view, edit, and print operations, for limiting the access to the digital document only to authorized users. Further, as personal computers and web services (e.g., Internet) have become more prevalent, there is an increase in digital document-related operations (e.g., copying and sharing of the document). Furthermore, copying of the digital documents could have been performed since the first recording of the information in the digital document form. However, the conventional procedures for controlling the unauthorized copying of the original digital document (or the source digital document) have been cumbersome. Moreover, the aforementioned access rights set on the authorized copy document are, by default, just inherited as is from the source document. This may cause inconveniences for a user to effectively perform the desired document-related operations on a copy of a digital document which may not be as sensitive as the original.

Therefore, there exists a need for techniques to efficiently generate a copy of a source document with a flexible and narrower range of restricted actions imposed onto the copy document to perform the desired document-related operations on the copy, in addition to providing other technical advantages.

SUMMARY

Various embodiments of the present disclosure provide systems and methods for managing access rights for a copy of a digital document.

In an embodiment, a computer-implemented method is disclosed. The computer-implemented method performed by a server system includes receiving a request for generating a copy of an original document from a user device associated with a user. The method includes performing an authorization of the request for generating the copy of the original document based, at least in part, on the access rights associated with the original document. The method includes generating a copy document of the original document, upon successful authorization. Further, the method includes determining the access rights defined for the copy document in the original document. The access rights correspond to restrictions and privileges defined for the copy document in the original document by a creator of the original document. The method includes transmitting the access rights to the copy document. The method further includes sending the copy document, with the access rights, to the user device of the user. The access rights set on the copy document facilitate the user to perform document-related operations on the copy document.

In another embodiment, a server system is disclosed. The server system includes a communication interface configured to receive a request for creating a copy of an original document, a memory including executable instructions and a processor communicably coupled to the communication interface. The processor is configured to execute the instructions to cause the server system to at least receive a request for generating a copy of an original document by a user device associated with a user. The server system is caused to perform an authorization of the request for generating the copy of the original document based, at least in part, on the access rights associated with the original document. The server system is caused to generate a copy document of the original document, upon successful authorization. Further, the server system is caused to determine the access rights defined for the copy document in the original document. The access rights correspond to restrictions and privileges defined for the copy document in the original document by a creator of the original document. The server system is caused to transmit the access rights to the copy document. The server system is further caused to send the copy document with the access rights to the user device of the user. The access rights set on the copy document facilitate the user to perform document-related operations on the copy document.

In yet another embodiment, the computer-implemented method is disclosed. The computer-implemented method performed by a server system includes receiving a request for generating a copy of an original document from a user device associated with a user. The method includes performing an authorization of the request for generating the copy of the original document based, at least in part, on the access rights associated with the original document. The method includes generating a copy document of the original document, upon successful authorization. Further, the method includes determining the access rights defined for the copy document in the original document. The access rights correspond to restrictions and privileges defined for the copy document in the original document by a creator of the original document. The method includes transmitting the access rights to the copy document. Transmitting the access rights to the copy document further includes allocating a vector value to each of the access rights defined for the copy document. The vector value indicates an operating status of the restrictions and privileges on the copy document. The method includes encrypting the copy document using a symmetric key or a public key of an asymmetric key pair. The method further includes sending the copy document with the access rights to the user device of the user. The method includes decrypting the encrypted copy document using a private key of the asymmetric key pair or a symmetric key, for enabling the user to perform document-related operations on the copy document based on the access rights set on the copy document.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "original document", and "copy document" used throughout the description, refer to an electronic document or a digital document (e.g., word documents, portable document format (PDF) files, spreadsheets, power point etc.) which can be imported to a computing device (e.g., computers, mobile phones etc.) and manipulated.

The term "access rights" refers to privileges and restrictions imposed on each of the original and copy documents.

OVERVIEW

Various embodiments of the present disclosure provide systems and methods for managing restrictive actions for a copy of an electronic document. At least one embodiment of the present disclosure provides a server system that generates the copy of an original document and transmits access rights to the copy document based on the access rights specified for the copy document in the original document.

In an embodiment, the server system is configured to receive a request for generating the copy of the original document from a user device associated with a user. The user who wishes to generate the copy of the document (i.e., the original document) may provide user inputs in an application installed in the user device of the user. The application is managed and hosted by the server system. Further, the server system performs authorization of the request for generating the copy of the original document based on the access rights associated with the original document. The server system generates a copy document of the original document, upon successful authorization. More specifically, the server system is configured to generate the copy document based on determining a granted right for copying in the access rights associated with the original document.

Thereafter, the sever system determines the access rights defined for the copy document. The access rights correspond to restrictions and privileges that are defined for the copy document by a creator of the original document. Further, the server system transmits the access rights to the copy document. More specifically, the server system is configured to allocate a vector value to each of the access rights defined for the copy document. The vector value indicates the operating status of the restrictions and privileges applied to the copy document. Additionally, the vector value allocated to the access rights defined for the copy document can be represented as a bit-vector for the copy document. Thereafter, the server system is configured to transmit the access rights to the copy document. In an embodiment, the server system is configured to transmit the access rights in an inactive state to the copy document based on determining one or more temporal constraints defined for the copy document. In this scenario, the access rights are enabled in the copy document based on the expiry of a temporal constraint of the one or more temporal constraints. Before sending the copy document, the server system is configured to encrypt the copy document using a public key of an asymmetric key pair. Thereafter, the server system is configured to send the copy document with the access rights to the user device of the user. The encrypted copy document is decrypted by the application running on the user device using a private key of the asymmetric key pair, for enabling the user to perform the document-related operations on the copy document.

Various embodiments of the present invention are described hereinafter with reference to FIG. 1 to FIG. 8.

Figure 1:
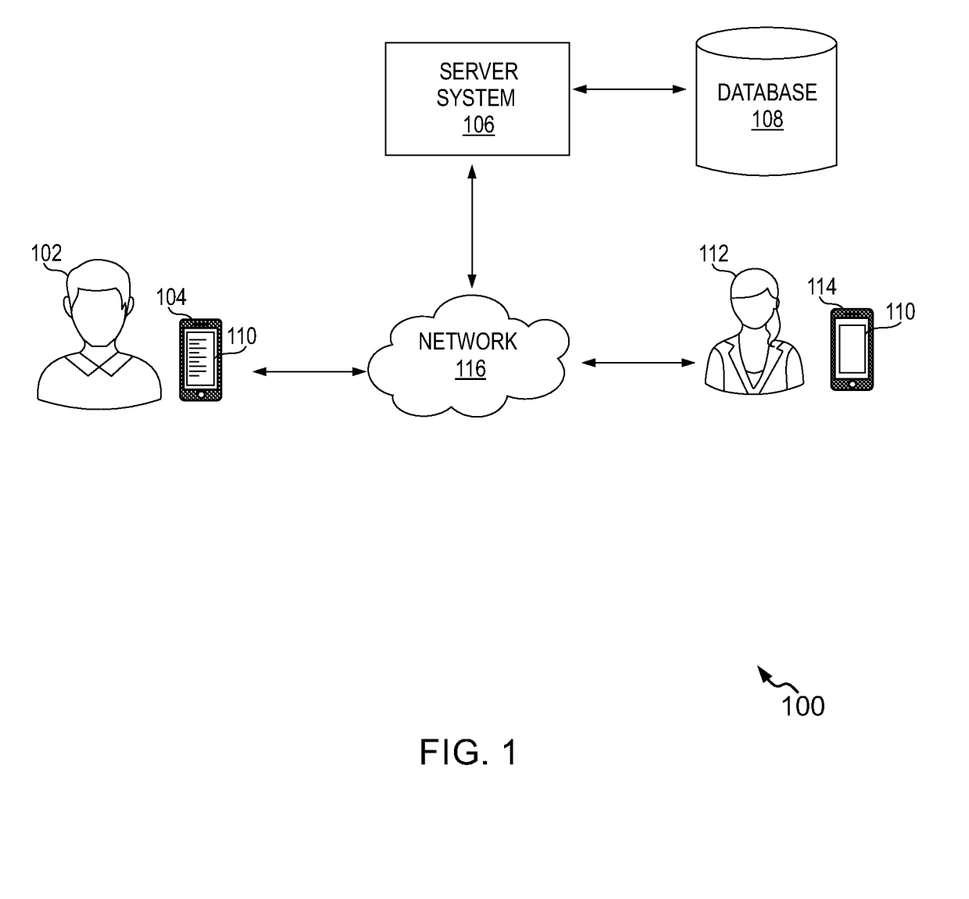
FIG. 1 illustrates an example representation of an environment related to at least some embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a user device 104 associated with a user 102, a user device 114 associated with a user 112, a server system 106, a database 108, wherein each of these components is coupled to or communicate to other components via a network 116. The network 116 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 116 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 116 may include a secure protocol (e.g., Hypertext Transfer Protocol (HTTPS)), and/or any other protocol, or set of protocols. In an example embodiment, the network 116 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

Examples of the user devices 104 and 114 include a mobile phone, a smart telephone, a computer, a laptop, a Personal Digital Assistant (PDA), a Mobile Internet Device (MID), a tablet computer, an Ultra-Mobile personal computer (UMPC), a phablet computer, a handheld personal computer, and the like. It should be noted that only two users are shown in FIG. 1 for the sake of brevity, and there can be any number of users.

In an embodiment, the user devices 104 and 114 are equipped with an instance of application 110 that is hosted and managed by the server system 106. In an embodiment, the server system 106 may provide the application 110, in response to a request received from the user devices 104 and 114 via the network 116. In another embodiment, the application 110 may be factory-installed on the user devices 104 and 114. The application 110 facilitates the users 102 and 112 to perform various document-related operations such as, creating, editing, viewing, copying, and the like. It should be noted that the document-related operations are performed on the document based on privileges/access rights granted by the user 102 (hereinafter interchangeably referred to as "the creator 102"). Additionally, the application 110 facilitates the creator 102 to define and/or manage access rights on a copy document derived from the original document.

The original document is a document created by the creator 102 with high-value restrictions i.e., it is not further editable. Further, the copy is a replica of the original document where the owner/author (e.g., the creator 102) can relax certain access rights (e.g., rights for editing, printing, etc.) for the copy document. The defined access rights for the copy document are propagated to the copy document upon creating the copy of the original document which is further explained in detail.

The server system 106 is embodied in at least one computing device in communication with the network 116. The server system 106 may be specifically configured, via executable instructions to perform one or more of the operations described herein. In general, the sever system 106 is configured to remotely store documents and manage secured access of the documents. More specifically, the server system 106 is configured to allow a user (e.g., the user 102) to create the original document. The user 102 can set the access rights to the original document, while creating the original document. The access rights correspond to the high-value restrictions on the original document. For example, the access rights may include, but are not limited to, viewing, printing, editing the document, document assembly, content copying or extraction, commenting, filling of form fields, signing, creation of templates, saving, distribution or sharing, and the like. Further, the server system 106 allows the user 102 to enable an automatic and/or individual control of the access rights defined for the copy document in the original document.

The server system 106 is configured to create a copy of the original document based on receiving a request access from a user (e.g., the user 112) through the application 110 via the network 116. The server system 106 may be configured to authorize the request and create the copy of the original document based at least on the access rights associated with the original document. It should be understood by a person skilled in the art that the access rights defined by the user 102 includes a granted access right for copying, which enables the server system 106 to generate the copy of the original document.

Thereafter, the server system 106 is configured to set the access rights to the copy document based at least on the access rights defined for the copy document in the original document by the user 102. More specifically, the server system 106 may be configured to allocate vector values (e.g., Boolean bits) for each access right to set the restrictions and privileges on the copy document. Upon transmitting the access rights, the server system 106 sends the copy document to the user device 114 of the user 104. This enables the user 112 to perform the document-related operations on the copy document in the application 110 based on the access rights set on the copy document. For example, a document (i.e., the original document) may be received from a user (e.g., the user 102) with an access right to copy and the "granted print right" on a copy. Such rights allow the user 112 to create and forward a copy document with 'granted print right', thereby allowing printing a copy of the current version of the original document. In an embodiment, the creator 102 can also request the server system 106 for generating the copy document for performing the document-related operations on the copy as explained above.

In an embodiment, the server system 106 may include one or more databases, such as a database 108. In an embodiment, the database 108 may be a separate entity (or an external database) that is in communication with the server system 106 via the network 116. The database 108 may be configured to store the documents (e.g., the original and copy documents) received from the users (e.g., the users 102 and 112), the access rights associated with each of the original and copy documents, their unique identifiers, and the like.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
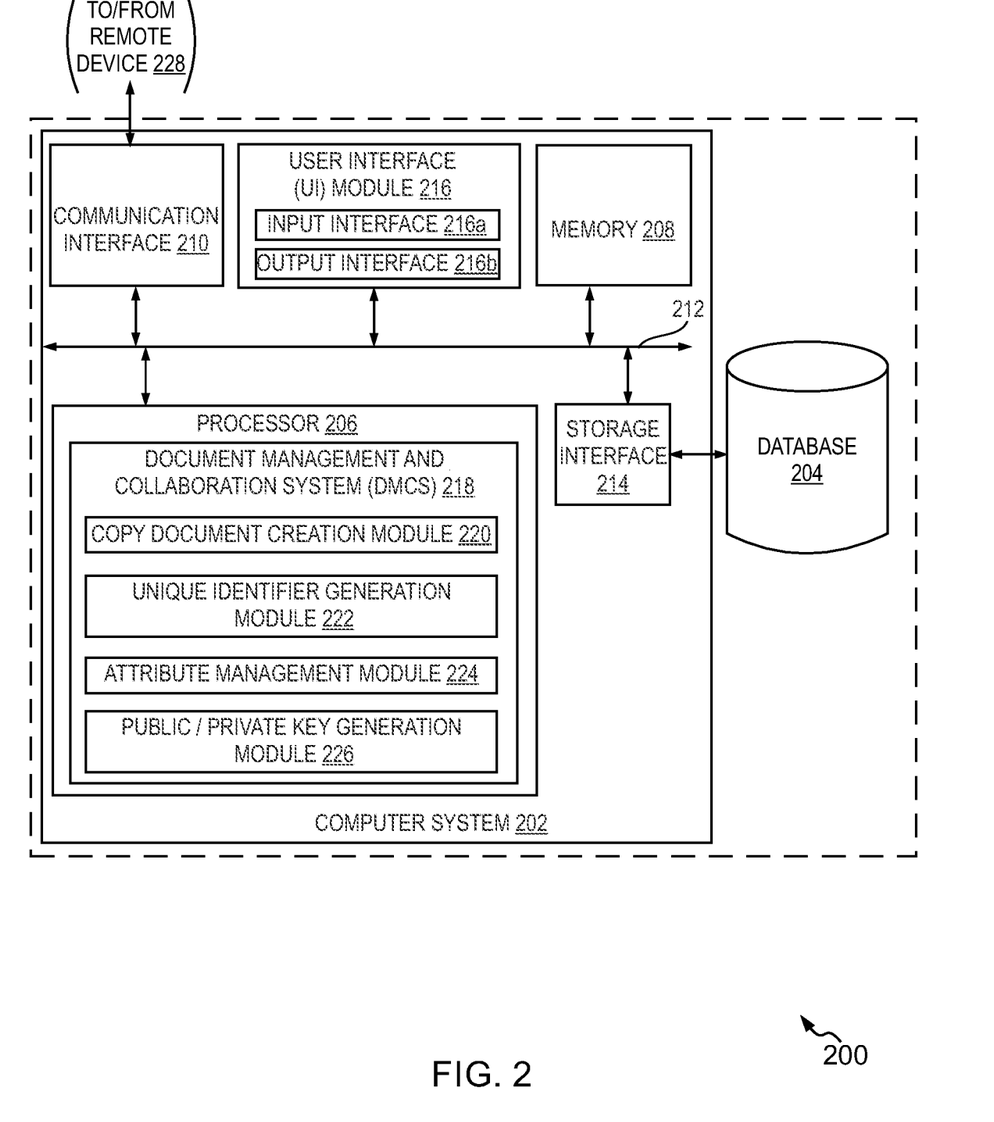
FIG. 2 illustrates a simplified block diagram of a server system used for managing the secured access of the documents, in accordance with one embodiment of the present disclosure.

FIG. 2 illustrates a simplified block diagram of a server system 200 used for managing the secured access of the documents, in accordance with one embodiment of the present disclosure. More specifically, the server system 200 is configured to create a copy of an original document and set the access rights defined in the original document for the copy document. Examples of the server system 200 include, but are not limited to, the server system 106 as shown in FIG. 1. The server system 200 includes a computer system 202 and a database 204. The computer system 202 includes at least one processor 206 for executing instructions, a memory 208, a communication interface 210, a storage interface 214 and a user interface (UI) module 216. The one or more components of the computer system 202 communicate with each other via a centralized circuit system 212.

In one embodiment, the database 204 is integrated within the computer system 202 and configured to store an instance of the application 110 and one or more components of the application 110. The one or more components of the application 110 maybe, but not limited to, one or more documents received from the users (e.g., the users 102 and 112), the access rights associated with the original document and the copy documents, and the like. The computer system 202 may include one or more hard disk drives storing the database 204. The storage interface 214 is any component capable of providing the processor 206 an access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The UI module 216 is in communication with the database 204. The UI module 216 is configured to present one or more UIs at the user devices 104 and 114 for facilitating creation of the document, performing the document-related operations, and the like. The UI module 216 includes an input interface 216a and an output interface 216b. The input interface 216a is configured to receive requests for accessing one or more stored documents (e.g., the original document) from the users (e.g., the users 102 and 112) through the application 110. For instance, access to the original document may include downloading a copy of the original document to the user devices 104 and 114. Examples of the input interface 216a may include, but are not limited to, a keyboard, a mouse, a joystick, a keypad, a touch screen, soft keys, camera, microphone, and the like. In an embodiment, the output interface 216b is configured to display the documents to the users in the application 110 for enabling the users to perform document-related operations. Examples of the output interface 216b may include, but are not limited to, a display such as a light emitting diode (LED) display, a thin-film transistor (TFT) display, a liquid crystal display, an active-matrix organic light-emitting diode (AMOLED) display, and the like The processor 206 includes a suitable logic, circuitry, and/or interfaces to execute computer-readable instructions for performing one or more operations to manage access to the stored documents. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes a suitable logic, circuitry, and/or interfaces to store a set of computer-readable instructions for performing the operations. Examples of the memory 208 include a random-access memory (RAM), a read-only memory (ROM), a removable storage drive, a hard disk drive (HDD), and the like. In some embodiments, the memory 208 may be realized in the form of a database server or a cloud storage working in conjunction with the server system 200, without deviating from the scope of the present disclosure.

The processor 206 is operatively coupled to the communication interface 210 such that the processor 206 is capable of communicating with a remote device 228 such as, the user devices 104 and 114, or with any entity connected to the network 116 as shown in FIG. 1.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a document management and collaboration system (DMCS) 218. The DMCS 218 includes one or more components such as a copy document creation module 220, a unique identifier generation module 222, an access rights management module 224 and a public/private key generation module 226. As such, the one or more components of the DMCS 218 (or the processor 206) as described above are communicably coupled with the application 110 and configured to manage secured access of the documents.

The copy document creation module 220 includes a suitable logic and/or interfaces for generating the copy of the original document based on receipt of a request from the user device (e.g., the user device 114) associated with the user 112. In one scenario, the user 112 may be invited by the creator 102. More specifically, the user 102 can share the document (i.e., the original document) to other users (e.g., the user 112). It should be noted that the users 102 and 112 may be registered users of the application 110 that is hosted and managed by the server system 200. In case the user 112 is a non-registered user, the user 112 may be asked to perform one-time registration on the application 110 for performing the document-related operations (e.g., generate the copy of the original document). In an embodiment, the user 112 may access the original document received from the creator 102 by using a third-party application installed on the user device 114 to perform the document-related operations. Examples of the third-party application can be an e-mail application, a document viewer or editor, a business application, etc. In another scenario, the user 102 may upload the original document to a portal associated with the application 110, and accessible to other users (e.g., the user 112) of the application 110. In this scenario, the user 112 may access the documents (i.e., the original document created by the user 102) stored in the portal through the web via the network 116 or the Internet.

More specifically, accessing the original document by the user 112 using the application 110 or the third-party application may include downloading a copy of the original document. The user 112 may provide input in the application 110 for generating the copy of the original document. Upon providing the input, the request for generating the copy of the original document is transmitted from the user device 114 to the server system 200 via the network 116. Thereafter, the copy document creation module 220 creates the copy of the original document by authorizing the request based, at least in part, on the access rights set on the original document. More specifically, the copy document creation module 220 creates the copy of the original document based on determining the granted right to copy from the access rights.

In an embodiment, the user 102 may transmit the details (e.g., email address, name etc.) related to the other users (such as, the user 112), while sharing the document to the user 112. The copy document creation module 220 may use the email address or the name for authorizing the user 112 in order to authenticate access of the document to the user 112.

The unique identifier generation module 222 includes a suitable logic and/or interfaces for generating a unique identifier for each of the copy documents derived from the original document. The unique identifier generated for each copy document may be stored in the database 204 for future retrieval. In an example scenario, the unique identifier may be represented as a file name of the copy document. In another example scenario, the unique identifier may be depicted in a header or footer section in the copy document. The unique identifier may be a numeric value, an alphanumeric value, a special character, or a combination thereof.

The unique identifier enables the server system 200 to differentiate between the copy document and the original document. Further, the server system 200 may utilize the unique identifier to identify the source (i.e., the original document) of the copy document. Additionally, the server system 200 may store both the original and the copy document in the same database 204 differentiating them using their unique identifiers. For example, the copy document 'B' derived from the original document 'A' may be shared to the user 112. The user 112 may perform the document-related operations on the document 'B' and upload the document 'B' in the application. In this case, the server system 200 groups the document 'B' and the document 'A' based on the unique identifier appended to the document 'B'.

The access rights management module 224 includes a suitable logic and/or interfaces for determining the access rights defined for the copy document in the original document. As explained above, the access rights are defined by the creator 102 of the original document. The access rights correspond to restrictions and privileges (e.g., editing, printing, sharing etc.) set on the copy document that is derived from the original document. The access rights defined for the copy document in the original document may be stored in a database (i.e., the database 204). As such, the access rights management module 224 may access the database 204 for extracting the access rights defined for the copy document. Thereafter, the access rights management module 224 manages the access rights of the copy document which will be explained further in detail.

More specifically, the access rights management module 224 assigns/allocates a vector value to each of the access rights defined for the copy document to indicate the operating status of each access right set on the copy document. In other words, the DMCS 218 employs a Boolean value structure to derive, determine and indicate whether an operation is restricted or not, on the copy document based on the access rights set in the original document for the copy document. The access rights management module 224 may assign a vector value of '1' for the access rights that correspond to privileges or granted rights and may assign a vector value of '0' for the access rights that correspond to the restrictions. For example, the copy document may be set with granted rights for printing, copying, editing of the copy document, and with a restriction for sharing of the copy document. In this scenario, the access rights management module 224 assigns the vector value of '1' to the access rights corresponding to the granted rights i.e., printing, copying, editing of the copy document and assigns the vector value of '0' to the access right corresponding to the restriction i.e., sharing of the copy document. In a non-limiting example, the Boolean bits or the vector values are used to turn on/off the restrictions and privileges in the copy document. In a similar manner, the access rights management module 224 may be configured to assign the vector values for the access rights associated with the original document, while creating the original document.

In an embodiment, the access rights defined for the original document and the copy document can each be represented as a bit-vector.

It should be noted that the access rights defined for the copy document should be no more restrictive than the access rights set on the original document. This enables the users 102 and/or 112 to generate the copy of the original document for performing the aforementioned document-related operations on the copy document. For example, the original document may be a spreadsheet tracking an impending real-estate transaction. To keep the actual details secret, the creator 102 may prohibit from granting access to printing and editing the original spreadsheet and grant access to create the copy of the original spreadsheet. In this scenario, the user 112 may create the copy of the spreadsheet by providing inputs in the application 110, in order to explore the document-related operations printing and editing on the copy.

Further, the DMCS 218 may be configured to determine one or more temporal constraints specified in the original document for the copy document by the creator 102. The temporal constraints can be time bound, event bound, context bound and other externalities, like public release of a product etc. In this scenario, the access rights management module 224 may assign the access rights to the copy document. It should be noted that the access rights transmitted to the copy document may be in an inactive state. The server system 200 may append temporal constraints to the copy document for enabling the access right transmitted to the copy document to be in the inactive state, prior to sending the copy document to the user 112. This prevents the user 112 to perform the allowed document-related operations until the expiry of the imposed temporal constraint on the copy document.

The access rights are enabled on the copy document based, at least in part, on expiry of the specified temporal constraint. In one example, the temporal constraint may be a time bound restriction with a pre-defined time period of 10 minutes. In this case, the access rights are allowed/enabled in the copy document after 10 minutes. It should be understood that the application 110 may request the server system 200 to perform the aforementioned operation. More specifically, the DMCS 218 managing the application 110 allows the access rights in the copy document, upon expiry of the predefined time period associated with the temporal constraints. As such, the temporal constraints may be removed automatically for enabling the access rights on the copy document, thereby allowing the user 112 to perform the allowed document-related operations in the copy document.

The public/private key generation module 226 includes a suitable logic and/or interfaces for generating public and private keys for performing encryption/decryption of the copy documents that are to be securely shared with the other users (e.g., the user 112). Upon assigning the access rights, the copy document is encrypted by using the public key of an asymmetric key pair, prior to sharing the copy document to the user 112. Thereafter, the encrypted copy document can be decrypted by the application 110 using the private key of the asymmetric key pair.

Figure 3:
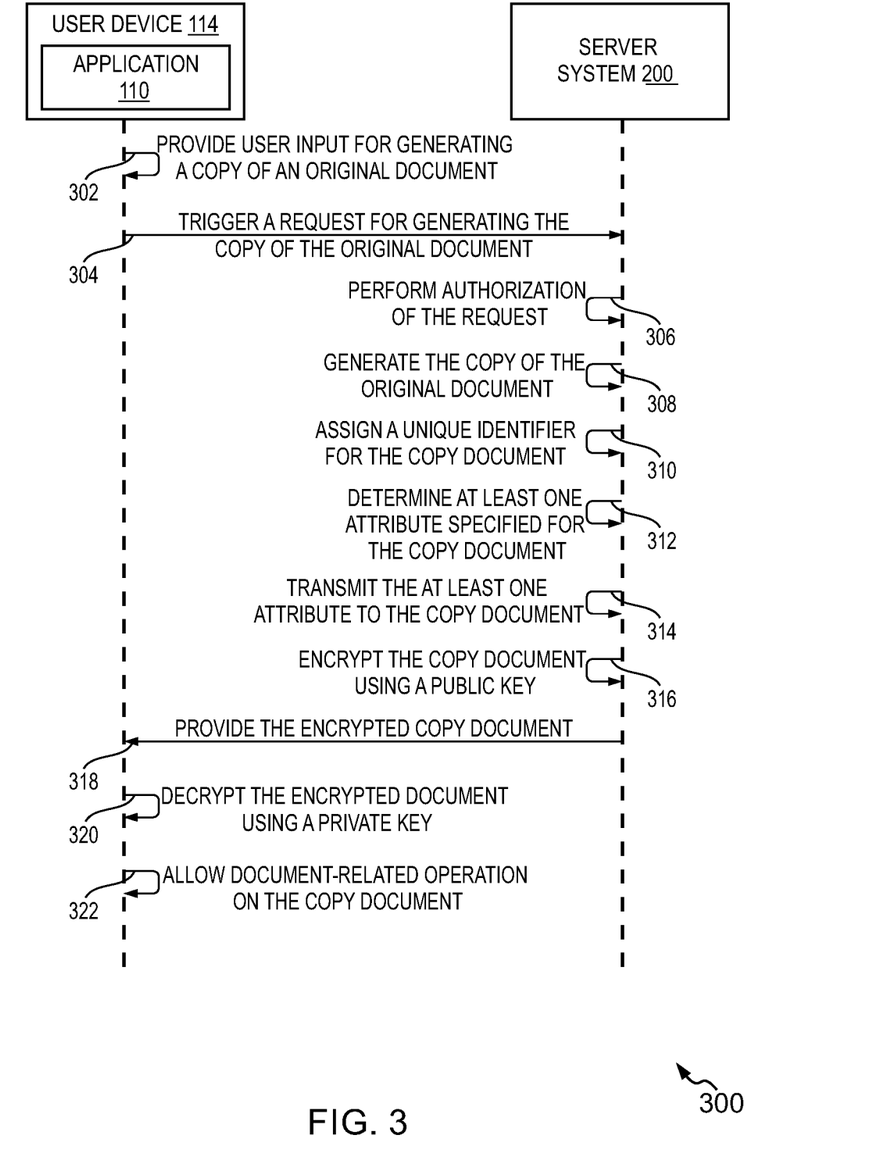
FIG. 3 illustrates a sequence flow diagram representation for managing access rights on a copy of an original document, in accordance with an example embodiment of the present disclosure.

Referring to FIG. 3, a sequence flow diagram 300 for managing the access rights on a copy of an original document, is shown in accordance with an example embodiment of the present disclosure. The steps of the sequence flow diagram 300 may not to be necessarily executed in the same order as they are presented. Further, one or more steps may be grouped together and performed in form of a single step, or one step may have several sub-steps that may be performed in parallel or in sequential manner.

At 302, a user such as the user 112 provides user inputs in the application 110 for generating/downloading a copy of an original document. As explained above, the user 112 may be invited to the original document by the creator 102, or the user 112 may access the original document that is available in the application 110.

At 304, the application 110 triggers a request to the server system 200 for generating the copy of the original document. Additionally, the access request to the original document may also include viewing the original document via an interface or portal (e.g., the third-party applications).

At 306, the server system 200 performs authorization of the request for creating the copy of the original document. In particular, the server system 200 may access a database (e.g., the database 204) for retrieving the access rights associated with the original document. The server system 200 authorizes the request based on identifying the access right to copy the original document from the access rights associated with the original document. Thereafter, the server system 200 generates the copy of the original document, based on successful authorization (see, 308).

At 310, the server system 200 assigns the unique identifier for the copy of the original document. The unique identifier is utilized by the server system 200 to differentiate between the copy document and the original document, and to identify the original document of the copy document for storing the copy document along with the original document in a database (e.g., the database 204) communicably coupled to the server system 200.

At 312, the server system 200 determines the access rights specified for the copy document. As explained above, the server system 200 accesses the database 204 for extracting the access rights specified for the copy document in the original document.

At 314, the server system 200 transmits the access rights to the copy document. More specifically, the server system 200 employs the Boolean value structure for assigning the Boolean bits (i.e., 1 or 0) to each access right based, at least in part, on the specified privileges and restrictions for the copy document. The Boolean bits indicate whether an operation is restricted or not (i.e., the operating status) in the copy document. Further, the set of Boolean permissions for each of the access rights can be represented as the bit vector or the tri-state vector for the copy document as explained with reference to FIG. 2.

At 316, the server system 200 encrypts the copy document using the public key of an asymmetric key pair of the application 110. At 318, the server system 200 provides the copy document to the user device 114. The encrypted copy document may include parameters appended by the server system 200. For example, the parameters can prevent a rouge application from storing the copy document with wide range of accessibility features.

At 320, the application 110 decrypts the encrypted copy document using the private key of the asymmetric key pair of the application 110. At 322, the application 110 allows the user 112 to perform the document-related operations on the received copy document. The user 112 may modify the copy document that creates an updated document. In an embodiment, document-related operations can be viewing the document, editing the content included in the document, changing the format of the document, printing of the document etc.

Figure 4:
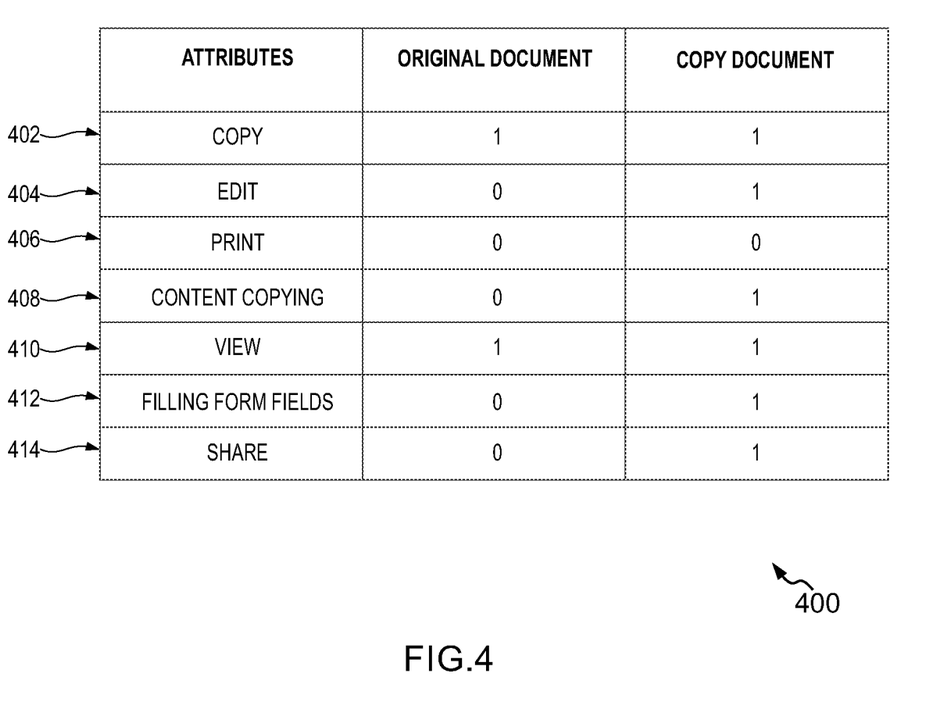
FIG. 4 illustrates an example representation of a table depicting Boolean values allocated to the access rights, in accordance with an example embodiment of the present disclosure.

FIG. 4 illustrates an example representation of a table 400 depicting the Boolean values allocated to each of the access rights associated with the original document and the copy document, in accordance with an example embodiment of the present disclosure. The table 400 includes a plurality of rows, where each row (such as, 402, 404, 406, 408, 410, 412 and 414) refers to an access right. As shown in FIG. 4, the access right depicted in each row includes 'COPY', 'EDIT', 'PRINT', 'CONTENT COPYING', 'VIEW', 'FILLING FORM FIELDS' and 'SHARE', respectively. It should be noted that the access rights shown in the table 400 are for exemplary purpose, and the document can be associated with any number of access rights.

Each access right associated with the original and the copy document is assigned with the Boolean bits (i.e., 0 or 1) for indicating turning off/on the access right in each of the original document and the copy document. The Boolean bits are assigned by the server system 200 based on the access rights defined by the creator 102 in the original document for the copy document as explained with reference to FIG. 2. Further, the Boolean bits are also allocated to the access rights associated with the original document. The vector value '1' is assigned to indicate the privilege on the document and the vector value '0' is assigned to indicate the restriction on the document. In an embodiment, the vector value '1' may be assigned for indicating the privilege on the document and the vector value '0' may be assigned for indicating the restriction on the document.

It is evident from the table 400 that the access rights associated with the original document such as copy and view are allocated with the vector value '1' and the access rights such as edit, print, content copying, filling form fields and share are allocated with the vector value '0'. The creator 102 has provided the access rights to view the document and create the copy of the document and all other access rights are restricted. Further, the access rights associated with the copy document such as copy, edit, content copying, view, filling form fields and share are allocated with the vector value '1' and the access right print is allocated with the vector value '0'. This enables the user (e.g., the user 112) to create the copy of the original document, based on the access rights set on the original document, and perform edits on the copy document, based on the access rights set on the copy document.

Figure 5:
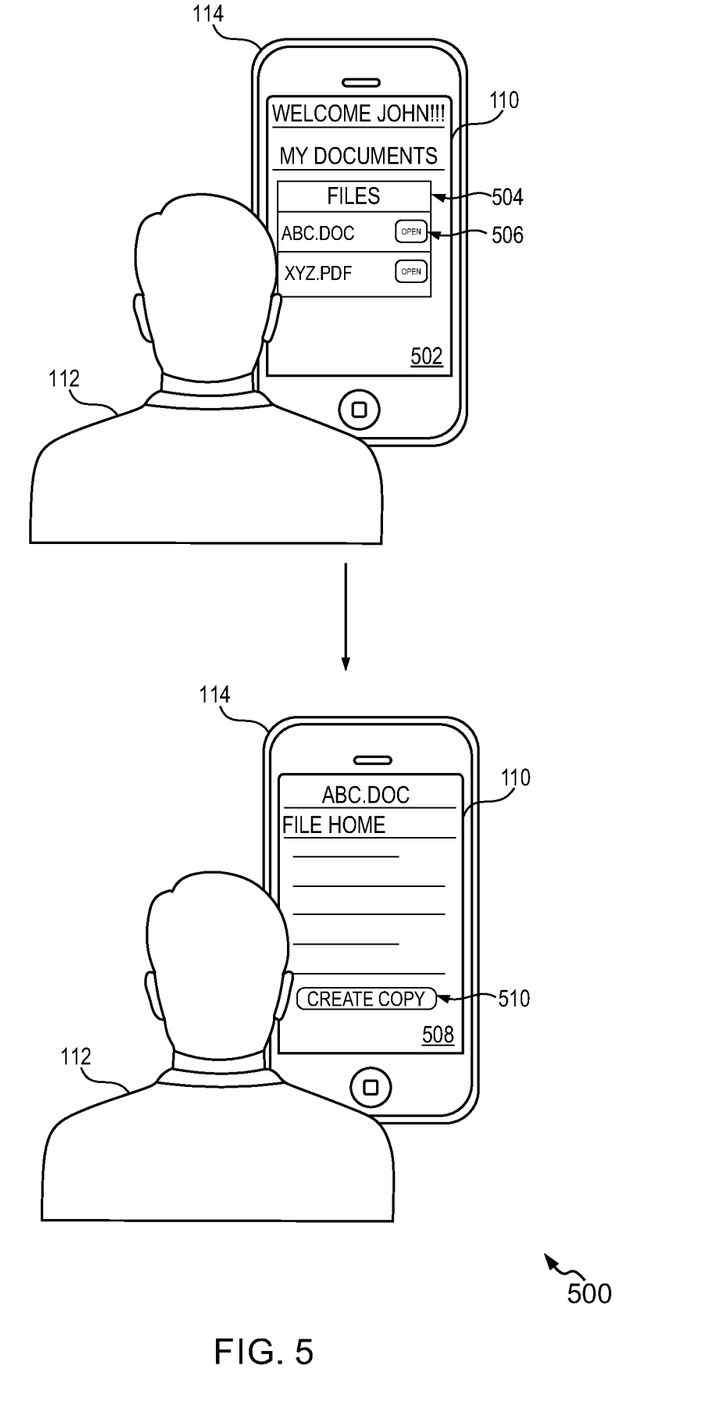
FIG. 5 illustrates an exemplary scenario for generating the copy of the original document, in accordance with an example embodiment of the present disclosure.

FIG. 5 illustrates an exemplary scenario 500 for generating the copy of the original document, in accordance with an example embodiment of the present disclosure. As shown in FIG. 5, the user (e.g., the user 112) is provided with a user interface (UI) 502 for depicting the documents in the application 110 on the user device 114. The UI 502 is depicted to include a list of documents 504 (exemplarily depicted to be 'ABC.DOC' and 'XYZ.PDF') in the application 110. The user 112 may access the document (exemplarily depicted to be ABC.DOC) by providing a selection input (e.g., click or tap) on a tab 506 associated with the text "OPEN". In one scenario, the document ABC.DOC in the list of documents 504 may be the original document received from the user 102. In another scenario, the document ABC.DOC may be uploaded by the user 102 in the application 110, and made accessible to the other users (e.g., the user 112) of the application 110.

Upon providing the selection input, the user 112 is prompted with a UI 508 which depicts/displays the document. Further, the UI 508 is depicted to include the access rights (see, 510 of FIG. 5) associated with the original document. The access right 510 is associated with the text "CREATE COPY". The user 112 provides input on the access right 510 for generating the copy of the original document, in order to perform various document-related operations on the copy document based on the access rights set on the copy document. Particularly, the application 110 triggers the request to the server system 200 for creating the copy of the original document. The server system 200 generates the copy document, upon performing authorization of the request by checking whether the original document is set with the access right for creating the copy. The steps performed in creating the copy of the original document, are explained with reference to FIGS. 1 to 3, therefore, it is not reiterated again for the sake of brevity.

Figure 6:
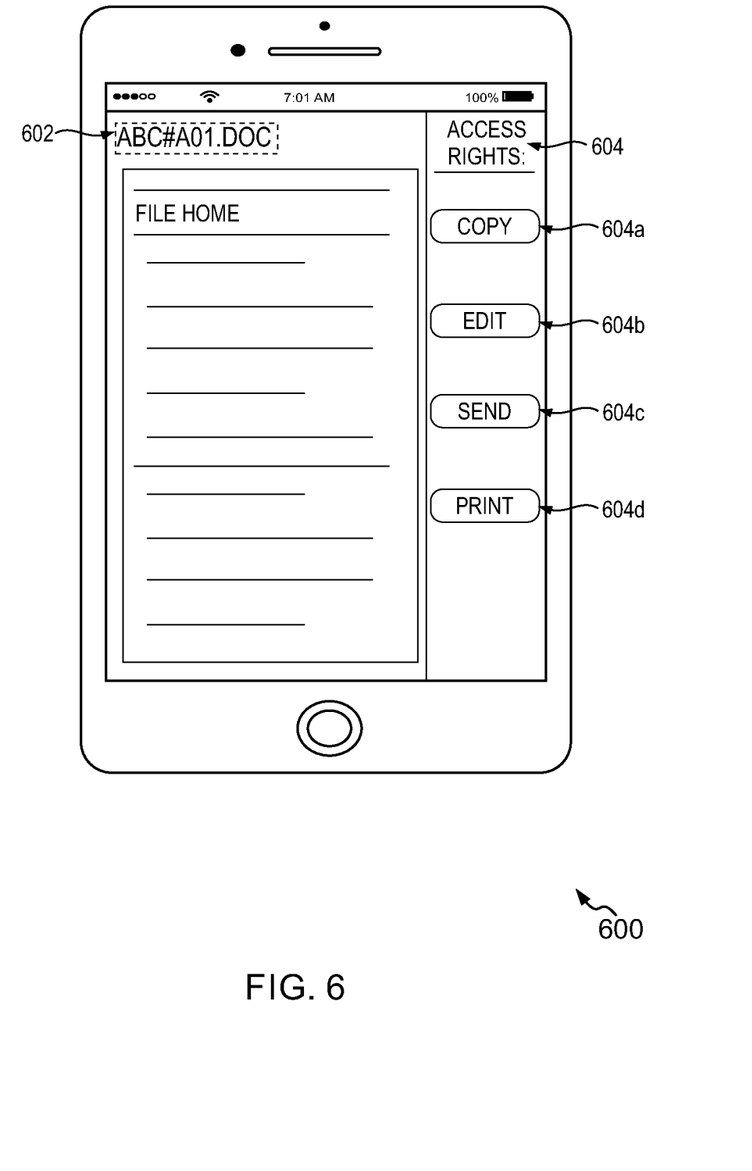
FIG. 6 illustrates an example representation of a user interface (UI), depicting the copy of the original document, for enabling a user to perform document-related operations on the copy document, in accordance with an example embodiment of the present disclosure.

FIG. 6 illustrates an example representation of an UI 600, depicting the copy of the original document, in accordance with an example embodiment of the present disclosure. The UI 600 is depicted to include the copy of the original document (e.g., the copy of the original document ABC.DOC). The UI 600 includes a file name 602 of the copy document (exemplarily depicted to be "ABC#A01.DOC"). The file name 602 of the copy document may be generated by the server system 200. The file name 602 generated by the server system 200 may correspond to the unique identifier. The unique identifier includes the file name ('ABC') of the original document along with a combination of the special character ('#') and the alphanumeric value ('A01'). As such, the server system 200 may distinguish between the copy and the original document based on the unique identifier represented as the file name in the copy document. Further, the UI 600 is depicted to include an access rights section 604 which includes access rights 604a, 604b, 604c and 604d (exemplarily depicted to be 'COPY', 'EDIT', 'SEND', and 'PRINT', respectively) associated with the copy document. The access rights 604a-604d are depicted on the UI 600 for users' selection, for performing the document-related operation on the copy document. As explained above, the access rights 604a-604d are set on the copy document based on the access rights specified for the copy document in the original document.

Figure 7:
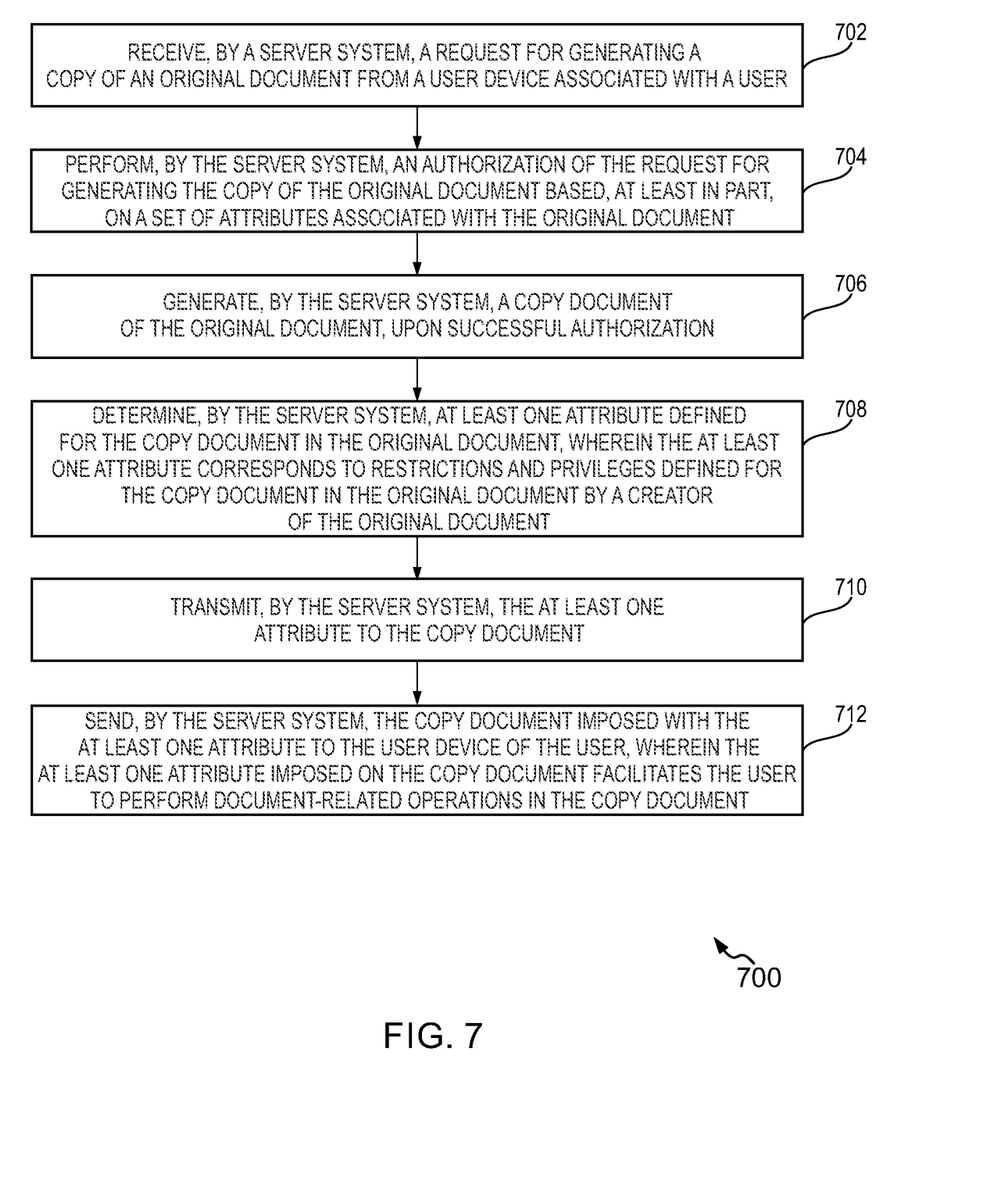
FIG. 7 illustrates a flow diagram of a computer-implemented method for managing the access rights for the copy of the original document, in accordance with an embodiment of the present disclosure.

FIG. 7 illustrates a flow diagram of a computer-implemented method 700 for managing the access rights for a copy of an original document, in accordance with an embodiment of the present disclosure. The method 700 depicted in the flow diagram may be executed by, for example, the server system 200. Operations of the flow diagram of method 700, and combinations of operation in the flow diagram of method 700, may be implemented by, for example, hardware, firmware, a processor, circuitry, and/or a different device associated with the execution of software that includes one or more computer program instructions. It is noted that the operations of the method 700 can be described and/or practiced by using a system other than these server systems. The method 700 starts at operation 702.

At operation 702, the method 700 includes receiving, by a server system, a request for generating a copy of an original document by a user device associated with a user.

At operation 704, the method 700 includes performing, by the server system, an authorization of the request, for generating the copy of the original document based, at least in part, on the access rights associated with the original document.

At operation 706, the method 700 includes generating, by the server system, a copy document of the original document, upon successful authorization.

At operation 708, the method 700 includes determining, by the server system, at least one access right defined for the copy document in the original document. The at least one access right corresponds to restrictions and privileges defined for the copy document in the original document by a creator of the original document. At operation 710, the method 700 includes transmitting, by the server system, the at least one access right to the copy document.

At operation 712, the method 700 includes sending, by the server system, the copy document with the access rights to the user device of the user. The access rights set on the copy document facilitate the user to perform document-related operations on the copy document.

Figure 8:
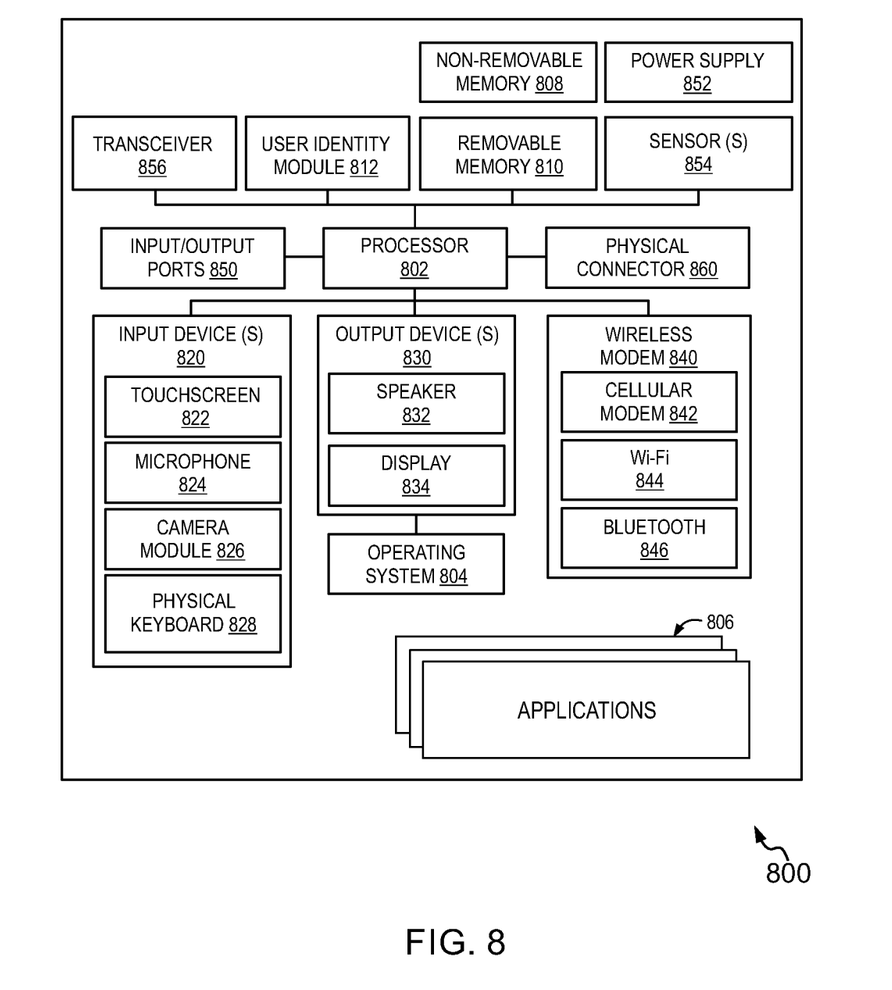
FIG. 8 is a simplified block diagram of an electronic device capable of implementing various embodiments of the present disclosure.

FIG. 8 is a simplified block diagram of an electronic device 800 capable of implementing various embodiments of the present disclosure. For example, the electronic device 800 may correspond to the user devices 104 and 114 of FIG. 1. The electronic device 800 is depicted to include one or more applications 806. For example, the one or more applications 806 may include the application 110 of FIG. 1. The application 110 can be an instance of an application downloaded from the server system 200. One of the one or more applications 806 installed on the electronic device 800 are capable of communicating with a server system for managing the access rights on a copy of an original document.

It should be understood that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an embodiment may include more, less or different components than those described in connection with the embodiment of the FIG. 8. As such, among other examples, the electronic device 800 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and supports for one or more operations of the application (see, the applications 806), such as the application 110 that implements one or more of the innovative features described herein. In addition, the applications 806 may include common mobile computing applications (e.g., telephony applications, email applications, calendars, contact managers, web browsers, messaging applications) or any other computing application.

The illustrated electronic device 800 includes one or more memory components, for example, a non-removable memory 808 and/or removable memory 810. The non-removable memory 808 and/or the removable memory 810 may be collectively known as a database in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 for example, an accelerometer, a gyroscope, a compass, or an infrared proximity sensor for detecting the orientation or motion of the electronic device 800 and biometric sensors for scanning biometric identity of an authorized user, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

The disclosed method with reference to FIG. 7, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system, a request for generating a copy of an original document from a user device associated with a user;
performing, by the server system, an authorization of the request for generating the copy of the original document based, at least in part, on the access rights associated with the original document;
upon successful authorization, generating, by the server system, a copy document of the original document;
determining, by the server system, the access rights defined for the copy document in the original document, wherein the access rights correspond to restrictions and privileges defined for the copy document in the original document by the creator of the original document;
transmitting, by the server system, the access rights to the copy document; and
sending, by the server system, the copy document with the access rights to the user device of the user, wherein the access rights set on the copy document facilitate the user to perform document-related operations on the copy document.

2. The computer-implemented method as claimed in claim 1, wherein transmitting the access rights to the copy document further comprises:
allocating, by the server system, a bit-value vector to the access rights defined for the copy document, wherein the bit-value vector indicates an operating status of the restrictions and privileges on the copy document.

3. The computer-implemented method as claimed in claim 1, further comprising:
encrypting, by the server system, the copy document using a symmetric key or a public key of an asymmetric key pair, prior to sending the copy document to the user device of the user; and
decrypting, by the application running on the user device, the encrypted copy document using a private key of the asymmetric key pair or a symmetric key, for enabling the user to perform the document-related operations on the copy document.

4. The computer-implemented method as claimed in claim 1, wherein the document-related operations performed on the copy document comprise one of:
editing the copy document,
viewing the copy document,
printing the copy document,
creating a copy of the copy document,
filling form fields in the copy document,
sharing the copy document, and
content copying from the copy document.

5. The computer-implemented method as claimed in claim 1, wherein the access rights defined for the copy document are no more restrictive than the access rights set on the original document by the creator, thus enabling the user to perform the document-related operations on the copy document.

6. The computer-implemented method as claimed in claim 1, further comprising:
determining, by the server system, one or more temporal constraints defined for the copy document in the original document;
transmitting, by the server system, the access rights to the copy document in an inactive state; and
facilitating, by the server system, enablement of the access rights in the copy document based, at least in part, on expiry of a temporal constraint of the one or more temporal constraints.

7. The computer-implemented method as claimed in claim 1, wherein generating the copy document further comprises:
generating, by the server system, a unique identifier for the copy of the original document.

8. The computer-implemented method as claimed in claim 7, wherein the unique identifier enables the server system to differentiate between the copy document and the original document, and identify the original document of the copy document for storing the copy document along with the original document.

9. A server system, comprising:
a communication interface configured to receive a request for creating a copy of an original document;
a memory comprising executable instructions; and
a processor communicably coupled to the communication interface and configured to execute the instructions to cause the server system, at least in part to:
   receive a request for generating a copy of an original document by a user device associated with a user,
   perform an authorization of the request for generating the copy of the original document based, at least in part, on the access rights associated with the original document,
   upon successful authorization, generate a copy document of the original document,
   determine the access rights defined for the copy document in the original document, wherein the access rights correspond to restrictions and privileges defined for the copy document in the original document by the creator of the original document,
   transmit the access rights to the copy document, and
   send the copy document with the access rights to the user device of the user, wherein the access rights set on the copy document facilitate the user to perform document-related operations on the copy document.

10. The server system as claimed in claim 9, wherein the server system is further caused at least in part, to:
   allocate a bit-value vector value to the access rights defined for the copy document, wherein the bit-value vector value indicates an operating status of the restrictions and privileges on the copy document.

11. The server system as claimed in claim 9, wherein the server system is further caused, at least in part, to:
   encrypt the copy document using a public key of an asymmetric key pair or a symmetric key, prior to sending the copy document to the user device of the user.

12. The server system as claimed in claim 9, wherein the document-related operations performed on the copy document comprise one of:
   editing the copy document,
   viewing the copy document,
   printing the copy document,
   creating a copy of the copy document,
   filling form fields in the copy document,
   sharing the copy document, and
   content copying from the copy document.

13. The server system as claimed in claim 9, wherein the access rights defined for the copy document are no more restrictive than the access rights set on the original document by the creator, thus enabling the user to perform the document-related operations on the copy document.

14. The server system as claimed in claim 9, wherein the server system is further caused, at least in part, to:
   determine one or more temporal constraints defined for the copy document in the original document;
   transmit the access rights to the copy document in an inactive state; and
   facilitate enablement of the access rights in the copy document based, at least in part, on expiry of a temporal constraint of the one or more temporal constraints.

15. The server system as claimed in claim 9, wherein the server system is further caused to:
   generate a unique identifier for the copy of the original document.

16. The server system as claimed in claim 15, wherein the unique identifier enables the server system to differentiate between the copy document and the original document, and identify the original document of the copy document for storing the copy document along with the original document in a database communicably coupled to the server system.

* * * * *